United States Patent
Hibbets (10) Patent No.: US 7,898,394 B2
(45) Date of Patent: Mar. 1, 2011

(54) SYSTEMS AND METHODS FOR COMMUNITY TAGGING

(75) Inventor: Jason Hibbets, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 352 days.

(21) Appl. No.: 11/747,220

(22) Filed: May 10, 2007

(65) Prior Publication Data

US 2008/0281769 A1 Nov. 13, 2008

(51) Int. Cl.
*G08B 5/00* (2006.01)
(52) U.S. Cl. .................. 340/330; 340/539.12; 340/539.1; 340/539.11; 340/573.1; 340/825.36; 340/825.49
(58) Field of Classification Search .................. 340/330, 340/539.12, 539.1, 539.11, 573.1, 825.36, 340/825.49
See application file for complete search history.

(56) References Cited

U.S. PATENT DOCUMENTS

| | | |
|---|---|---|
| 6,223,165 B1 | 4/2001 | Lauffer |
| 6,374,261 B1 | 4/2002 | Alvarez et al. |
| 6,446,058 B1 | 9/2002 | Brown |
| 6,477,667 B1 | 11/2002 | Levi et al. |
| 6,493,702 B1 | 12/2002 | Adar et al. |
| 6,519,629 B2 | 2/2003 | Harvey et al. |
| 6,691,162 B1 | 2/2004 | Wick |
| 6,739,508 B2 | 5/2004 | Ushioda et al. |
| 6,938,068 B1 | 8/2005 | Kraft et al. |
| 6,988,126 B2 | 1/2006 | Wilcock et al. |
| 7,007,235 B1 | 2/2006 | Hussein et al. |
| 7,028,228 B1 | 4/2006 | Lovy et al. |
| 7,069,480 B1 | 6/2006 | Lovy et al. |
| 7,159,011 B1 | 1/2007 | Knight et al. |
| 7,359,894 B1 | 4/2008 | Liebman et al. |
| 7,382,247 B2 * | 6/2008 | Welch et al. ............. 340/539.12 |
| 7,437,382 B2 | 10/2008 | Zhang et al. |
| 7,472,071 B2 | 12/2008 | Marks et al. |
| 7,543,232 B2 | 6/2009 | Easton et al. |
| 7,546,254 B2 | 6/2009 | Bednarek |
| 7,548,914 B2 | 6/2009 | Bell et al. |
| 7,558,828 B1 | 7/2009 | Panzer |
| 7,600,160 B1 | 10/2009 | Lovy et al. |

(Continued)

FOREIGN PATENT DOCUMENTS

WO 9939279 8/1999

(Continued)

OTHER PUBLICATIONS

U.S. Appl. No. 11/754,520, filed May 29, 2007, N. Lee Faus.

(Continued)

*Primary Examiner* — Daryl Pope
(74) *Attorney, Agent, or Firm* — MH2 Technology Law Group LLP (57) ABSTRACT

An embodiment relates generally to a method of organizing information. The method includes providing for a knowledgebase and providing for a first set of tags configured to be applied to items in the knowledgebase. The method also includes providing for a second set of tags configured to be applied to items in the knowledgebase and searching the knowledgebase based on at least one of the first set of tags and the second set of tags. The method further includes ranking result items in a search result favoring the result items tagged with terms for the first set of tags.

16 Claims, 7 Drawing Sheets

U.S. PATENT DOCUMENTS

| | | |
|---|---|---|
| 7,603,350 B1 | 10/2009 | Guha |
| 7,617,127 B2 | 11/2009 | Hunt et al. |
| 7,664,747 B2 | 2/2010 | Petras et al. |
| 7,668,838 B2 | 2/2010 | Baio et al. |
| 7,698,242 B2 | 4/2010 | Van Camp et al. |
| 7,752,314 B2 | 7/2010 | Trevor et al. |
| 2001/0032244 A1 | 10/2001 | Neustel |
| 2001/0037317 A1 | 11/2001 | Freiwirth et al. |
| 2002/0049738 A1 | 4/2002 | Epstein |
| 2002/0055935 A1 | 5/2002 | Rosenblum |
| 2002/0087520 A1 | 7/2002 | Meyers |
| 2003/0028525 A1 | 2/2003 | Santos et al. |
| 2003/0033302 A1 | 2/2003 | Banerjee et al. |
| 2003/0101083 A1 | 5/2003 | Venkatesh et al. |
| 2003/0144895 A1 | 7/2003 | Aksu et al. |
| 2004/0107125 A1 | 6/2004 | Guheen et al. |
| 2004/0199573 A1 | 10/2004 | Schwartz et al. |
| 2005/0138115 A1 | 6/2005 | Llamas et al. |
| 2005/0256866 A1 | 11/2005 | Lu et al. |
| 2006/0004601 A1 | 1/2006 | Marks |
| 2006/0106788 A1 | 5/2006 | Forrest |
| 2006/0136869 A1 | 6/2006 | Lamm et al. |
| 2006/0161524 A1 | 7/2006 | Roy et al. |
| 2006/0167846 A1 | 7/2006 | Nevin et al. |
| 2006/0200356 A1 | 9/2006 | Wan |
| 2006/0252547 A1 | 11/2006 | Mizrahi et al. |
| 2006/0277091 A1 | 12/2006 | Kochikar et al. |
| 2006/0282304 A1 | 12/2006 | Bedad et al. |
| 2006/0288087 A1 | 12/2006 | Sun |
| 2007/0094228 A1 | 4/2007 | Nevin et al. |
| 2007/0106659 A1 | 5/2007 | Lu et al. |
| 2007/0174247 A1 | 7/2007 | Xu et al. |
| 2007/0179835 A1 | 8/2007 | Ott, IV et al. |
| 2007/0198319 A1 | 8/2007 | Sciuk |
| 2007/0260587 A1 | 11/2007 | Mohan |
| 2007/0274495 A1 | 11/2007 | Youd et al. |
| 2007/0282781 A1 | 12/2007 | Mathiesen et al. |
| 2007/0288292 A1 | 12/2007 | Gauger |
| 2008/0046394 A1 | 2/2008 | Zhou et al. |
| 2008/0082607 A1 | 4/2008 | Sastry et al. |
| 2008/0091686 A1 | 4/2008 | Beard |
| 2008/0147741 A1 | 6/2008 | Gonen et al. |
| 2008/0162376 A1 | 7/2008 | Roulston |
| 2008/0228504 A1 | 9/2008 | Nguyen et al. |
| 2008/0301091 A1 | 12/2008 | Hibbets et al. |
| 2008/0301115 A1 | 12/2008 | Mattox et al. |
| 2008/0301674 A1 | 12/2008 | Faus |
| 2008/0306932 A1 | 12/2008 | Faus et al. |
| 2009/0063386 A1 | 3/2009 | Hibbets |
| 2009/0187626 A1 | 7/2009 | Degaugue |

FOREIGN PATENT DOCUMENTS

| | | |
|---|---|---|
| WO | 0135272 | 5/2001 |
| WO | 0153970 | 7/2001 |

OTHER PUBLICATIONS

U.S. Appl. No. 11/759,785, filed Jun. 7, 2007, N. Lee Faus et al.
U.S. Appl. No. 11/756,334, filed May 31, 2007, John R. Mattox et al.

* cited by examiner

SYSTEMS AND METHODS FOR COMMUNITY TAGGING

FIELD

This invention relates generally to tagging, more particularly, to systems and methods for community tagging.

DESCRIPTION OF THE RELATED ART

A tag can be defined as a keyword or term associated with or assigned to an item of information, e.g., a picture, an article, video file, Wiki page, etc. The tag aids in defining the item of information and enables keyword-based classification of information it is applied thereto.

Tags are usually chosen informally and personally by either the author and/or user of the item of information. Tags are typically used in dynamic, flexible, automatically generated Internet taxonomies for online resources such as computer files, web pages, digital images, and Internet bookmarks, and current generation of web browsers.

While tags can be beneficial in organizing information, tagging is not without its drawbacks and disadvantages. For example, the tag does not typically convey any meaning or semantics of the tag. The tag "apple" can refer to the fruit, the computer company, a British music label and/or a female singer. This lack of semantic distinction in tags can lead to inappropriate connection between items. Moreover, the selection of tag terms can be highly user-specific. Different users can use drastically different terms to describe the same concept. As an example, the terms that can be used to tag a version of Apple Computer's operating system can be "Mac OS X", "Tiger", "closed" and many other terms. Accordingly, users of tagging systems are forced to make judgments based on the number of connections and the choices of tag terms, whether possible connections between items are valid for their interest.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments pertain generally to a method of organizing and accessing a knowledgebase. More particularly, a knowledgebase can be tagged with an approved set of tags as well as a community set of tags. The approved set of tags can be developed from the community set of tags. Users with super privileges can apply a predefined set of tags to knowledgebase items, where the knowledgebase items can be articles, posts, or other similar information useful to the user community. Ordinary users can apply tags to knowledgebase items based on a community set of tags, where the community set of tags can be any term supplied by an ordinary user. The community set of tags can also be configured to show the popularity of any tag within the set. Accordingly, a subsequent user can search the knowledgebase based on the approved set of tags, the community set of tags, or a combination of the two tags. The subsequent user can focus the search by determining the popularity of tag terms within the community set of tags.

Figure 1:
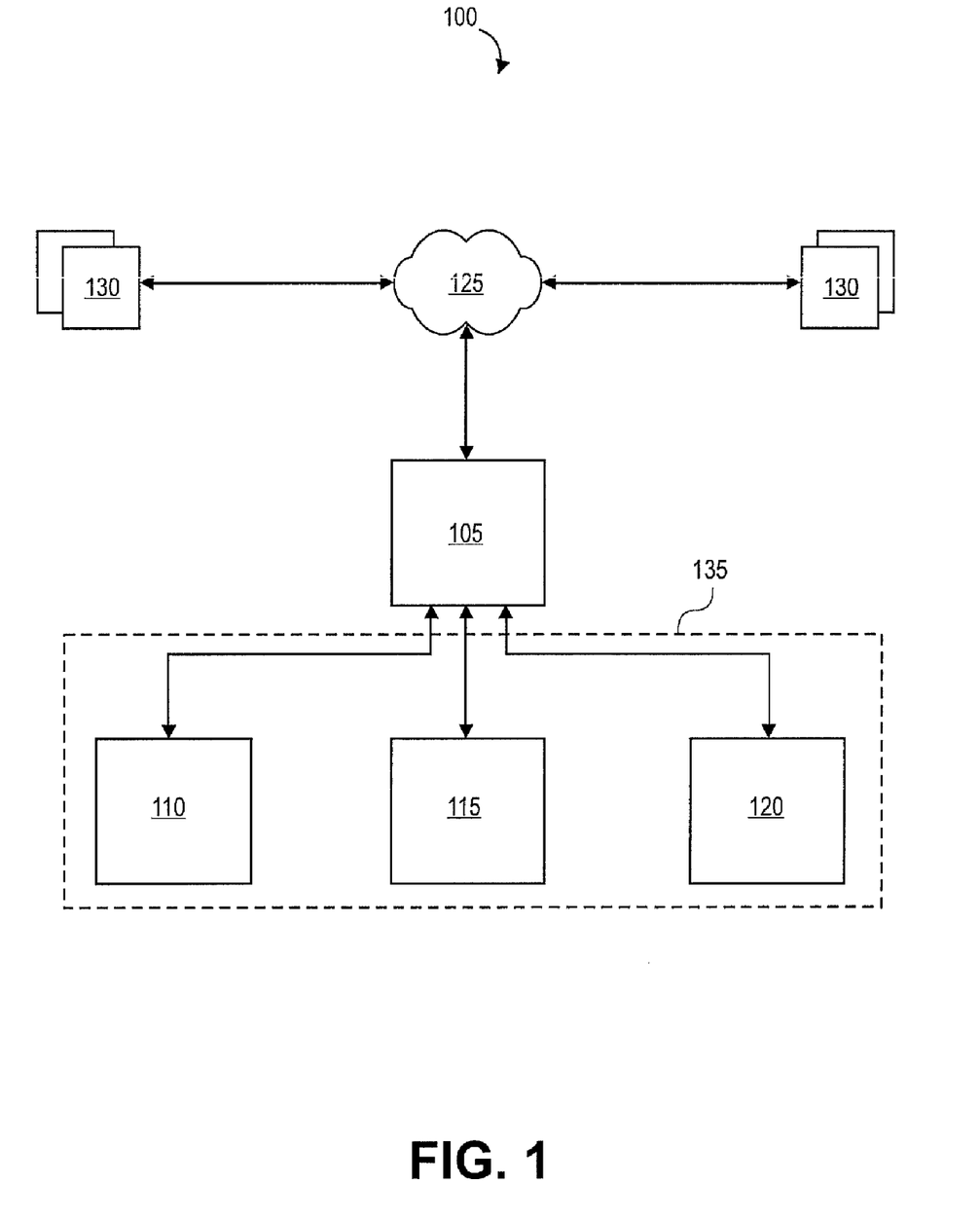
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a service portal 105 coupled to a network 125. Users 130 can interface with the service portal 105 through the network 125. The network 125 can be a combination of local area networks, wide area networks, public networks, and private networks such as the Internet.

The users 130 can interface with the service portal 105 using computing platforms such as personal computers, workstations, private local area networks (e.g., business entity or government entity) or other similar device that can provide network access and interact with the service portal 105.

In some embodiments, the service portal 105 can be configured to provide services. As a non-limiting example, the service portal 105 can be configured to provide information for users to research, compare and purchase software, hardware and consulting services in support of the those software and/or hardware purchases. The service portal 105 can also be configured to provide support services by subscription to those same software and/or hardware purchases. The service portal 105 can further be configured to provide a knowledgebase for a user in a community can search for answers regarding issues. The community can comprise of registered and non-registered users.

The service portal 105 can be configured to provide at least the described services with a service backend 135. The service backend 135 can comprise at least a knowledge server 110, an issue tracker server 115 and a chat server 120.

The knowledge server 110 can be configured to provide a knowledgebase for the system 100. The knowledgebase can comprise of Wiki documents, articles, frequently asked questions (FAQs), transcripts of chat sessions and other informational items related to issues deemed worth discussing by the community. The knowledge server 110 can also be configured to search and retrieve requested informational items from its own database but also from third party sites such as Google™, Yahoo™, etc. The knowledge server 110 can then rank and prioritize the search results from internal and external sources for the requesting user, based on a single interface provided by the server portal 105. In some embodiments, the knowledge server 110 can be implemented on a separate server using open-source technologies.

The service portal 105 can also be configured to interface with the issue tracker server 115, which provide support services for the service portal 105. More particularly, a user may have a problem or issue with a purchased software and/or hardware from the service portal 105. The user can return to the service portal 105 and request support services based on a purchased service subscription through a user interface generated by the service portal 105. The service portal 105 can redirect the support request to the issue tracker server 115. The issue tracker server 115 can open an associated service ticket for resolution by support personnel. The issue tracker server 115 can also be configured to attach transcripts of any chat sessions between the support personnel and the user as well as documenting the solution(s) to the issue of the user. In some aspects, the documented solution can be converted into an article, added to a frequently asked question list, Wiki page, etc., and passed onto the knowledge server 110.

The chat server 120 can be configured to couple with the service portal 105. A user with an issue or question can log into the service portal 105 and search for solutions and/or answers. The service portal 105 can generate a user interface and display an option for requesting assistance via a chat session. If a user selects this option, the service portal 105 can pass the request over to the chat server 120. The chat server 120 can be configured to provide the chat session to the user via another user interface provided by the service portal 105. The chat server 120 can also be configured to save the chat sessions for later review. For example, support personnel can turn the chat session into an article or extract discussed solutions in the chat sessions into or add to a frequently asked questions list.

Figure 2:
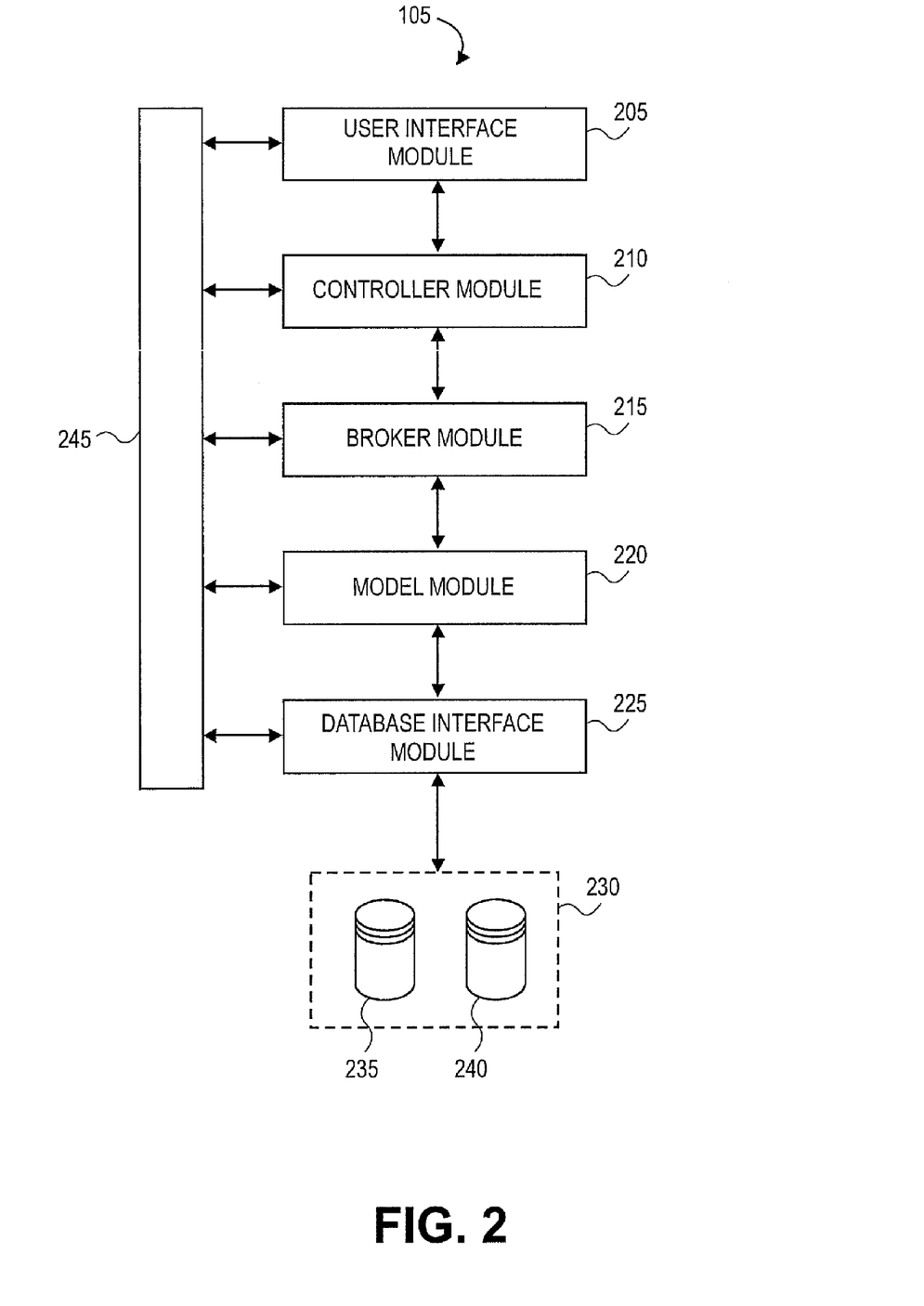
FIG. 2 illustrates an exemplary service portal of the system shown in FIG. 1 in accordance with another embodiment.

FIG. 2 illustrates a more detailed block diagram of the service portal 105 in accordance with another embodiment. It should be readily apparent to those of ordinary skill in the art that the service portal 105 depicted in FIG. 2 represents a generalized schematic illustration and that other components may be added or existing components may be removed or modified.

As shown in FIG. 2, the service portal 105 can comprise a user interface module 205, a controller module 210, a broker module 215, a model module 220, a database interface module 225, and a logging module 245. The user interface module 205 can be configured to generate the graphical user interfaces (GUIs) for users to interact with service portal 105. The user interface module 205 can generate the necessary functionality of the GUIs based on hypertext markup language ("HTML") code, cascading style sheets ("CSS") and/or Java Server Pages (JSP).

The user interface module 205 can be configured with a controller module 210, which is configured to provide code support for the functionality embedded in the GUIs of the user interface module 205. More particularly, the controller module 210 can comprise of DWR, Dojo, and a library of JavaScript apps. The controller module 210 can be implemented using direct web remoting (DWR). DWR can be considered a Java and JavaScript open source library which allows a programmer to write Asynchronous JavaScript and XML ("Ajax") web applications or interactive web applications. DWR allows generally JavaScript code in the GUI generated by the user interface module 205 to use Java methods.

The Dojo component can be considered an open-source JavaScript Toolkit to construct the dynamic web user interfaces. As such, the controller module 210 can dynamically generate user interfaces to pass along to the user interface module 205 for display to a user.

The library of JavaScript apps can define a list of predetermined functionality that users are likely to call. For example, one JavaScript can be "Get Price of Product X".

The controller module 210 can also be coupled with the broker module 215. The broker module 215 can be configured to provide a high-level business logic for the service portal 105. More particularly, the business logic can generally filter and direct an incoming request to the appropriate server of the service backend 130 (see FIG. 1). For example, the broker module 215 can receive a request for delivery terms on a selected piece of hardware. The broker module 215 can identify the server that can satisfy the request, e.g., service portal 105, and forward the request. Similarly, a request for technical support can be identified by the broker module 215 and be forwarded to the issue tracker server 115 to be serviced.

The broker module 215 can also be coupled with model module 220, which is configured to provide a schema for inquiries to the databases 230. The databases 230 can, abstractly, contain two databases: a user profile database 235 and a product catalog 240. The databases 230 can be implemented using any type of database systems provided by vendors such as MySQL, Oracle, Sybase, International Business Machines, etc. The model module 220 can provide the schema to formulate queries to pass to the databases 230 through the database interface module 225. The model module 220 can be implemented using an open source lightweight framework such as Spring Application Framework supported by data access objects, beans, and manager.

The database interface module 225 can be configured to provide an abstraction between the databases 230 and the model module 220. The database interface module 225 can be implemented with Hibernate or other similar abstractions. The database interface module 225 provides object relational mapping and persistence management with the databases 230.

The modules 205-225 of the service portal 105 can also be implemented using be implemented using an open source servlet container and webserver such as Tomcat™ in some embodiments. Other embodiments could use proprietary servlet container and webserver technologies.

The logging module 245 can be configured to couple with the user interface module 205, the controller module 210, the broker module 215, the model module 220 and the database interface module 225. The logging module 245 can also be configured to provide logging and exception handling for all the coupled modules (205-225). The aforementioned module can provide functions which may be commonly called by the rest of the modules (205-225) of the service portal 105. The logging module 245 can be implemented using aspect-oriented programming as known to those skilled in the art.

Figure 3:
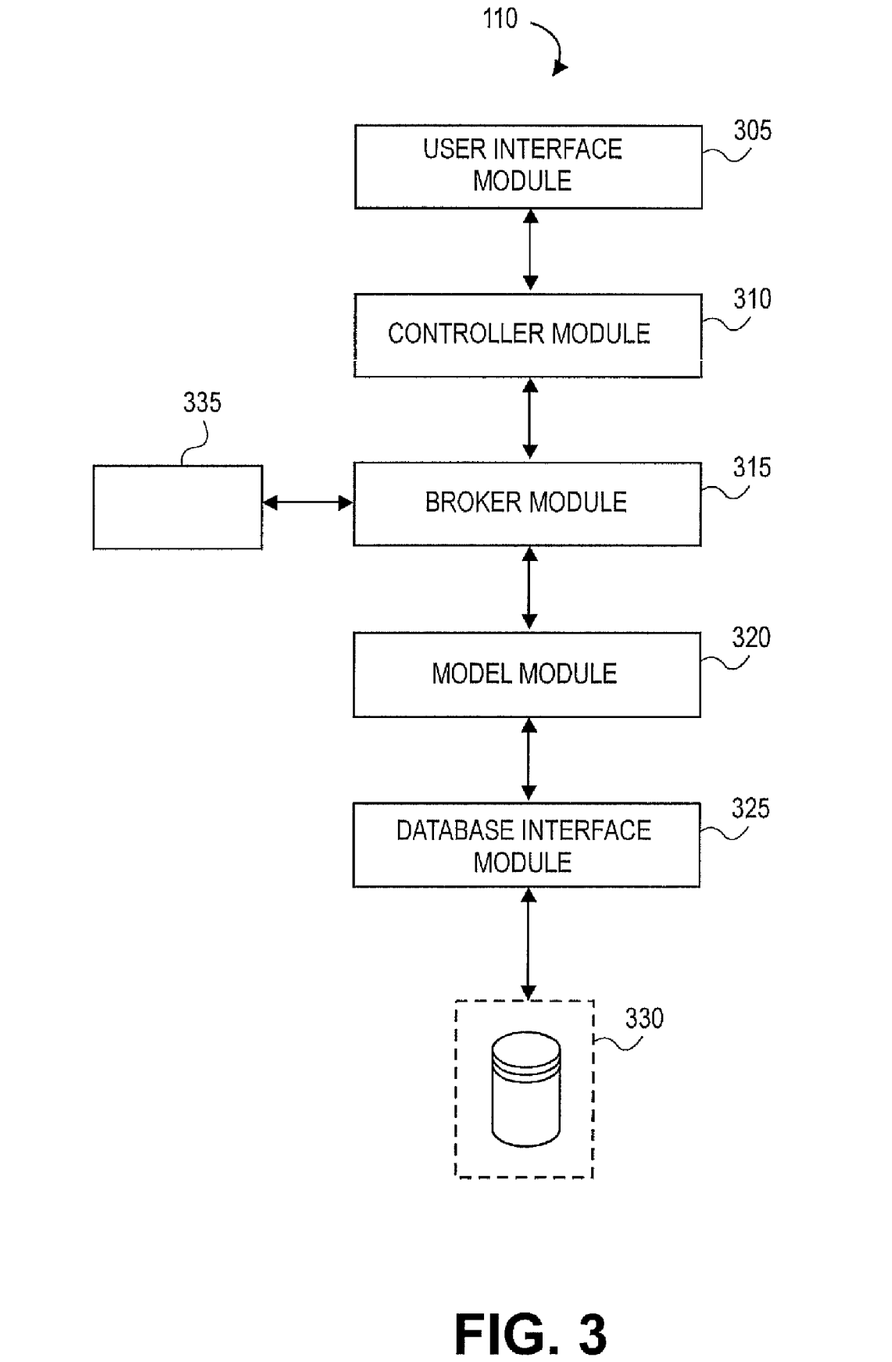
FIG. 3 depicts an exemplary knowledge server of the system shown in FIG. 1 in accordance with yet another embodiment.

FIG. 3 illustrates a more detailed block diagram of the knowledge server 110 in accordance with another embodiment. It should be readily apparent to those of ordinary skill in the art that the knowledge server 110 depicted in FIG. 3 represents a generalized schematic illustration and that other components may be added or existing components may be removed or modified.

FIG. 2 and FIG. 3 share some common components. As such, the description of the common components is being omitted and the description of these components with respect to the FIG. 2 is being relied upon to provide adequate description of the common components.

As shown in FIG. 3, the knowledge server 110 can comprise at least a user interface module 305, a controller module 310, a broker module 315, a model module 320 and a database interface module 325.

Similar to the service portal 105, the user interface module 305 of the knowledge server 110 can be configured to provide the GUIs for users to interact with the knowledge server 110. The functionality for selected actions by the users is provided by the controller module 310. The controller module 310 can be configured to provide the associated code for the requested functionality of the selected action in the GUI. The broker module 315 can be configured to provide high-level business logic for the knowledge server 110. More particularly, the broker module 315 can provide filtering for the requests entering the knowledge server 110. For these requests, the broker module 315 can receive these requests from the service portal 105 through the server interface 335. The server interface 330 can be implemented using simple object access protocols, web services, etc. The knowledge server 110 can also use the server interface 335 to return requested information to the service portal 105. Unlike the service portal 105, the knowledge server 110 can be configured to prevent direct access to the knowledge server 110 but can only be accessed through the service portal 105.

The broker module 315 of the knowledge server 110 can also be coupled to the model module 320, which is configured to provide a schema for queries into the knowledge database 330. The database interface module 325 can be configured to provide a level of abstraction between the queries from the broker module 320 to the actual physical implementation of the knowledge database 330. As previously described, the knowledge database 330 can be implemented with database architectures provided by vendors such as MySQL, Oracle, Sybase, International Business Machines, and other similar manufacturers.

The modules 305-325 of the service portal 105 can also be implemented using be implemented using an open source servlet container and webserver such as Tomcat™ in some embodiments. Other embodiments could use proprietary servlet container and webserver technologies.

Figure 4:
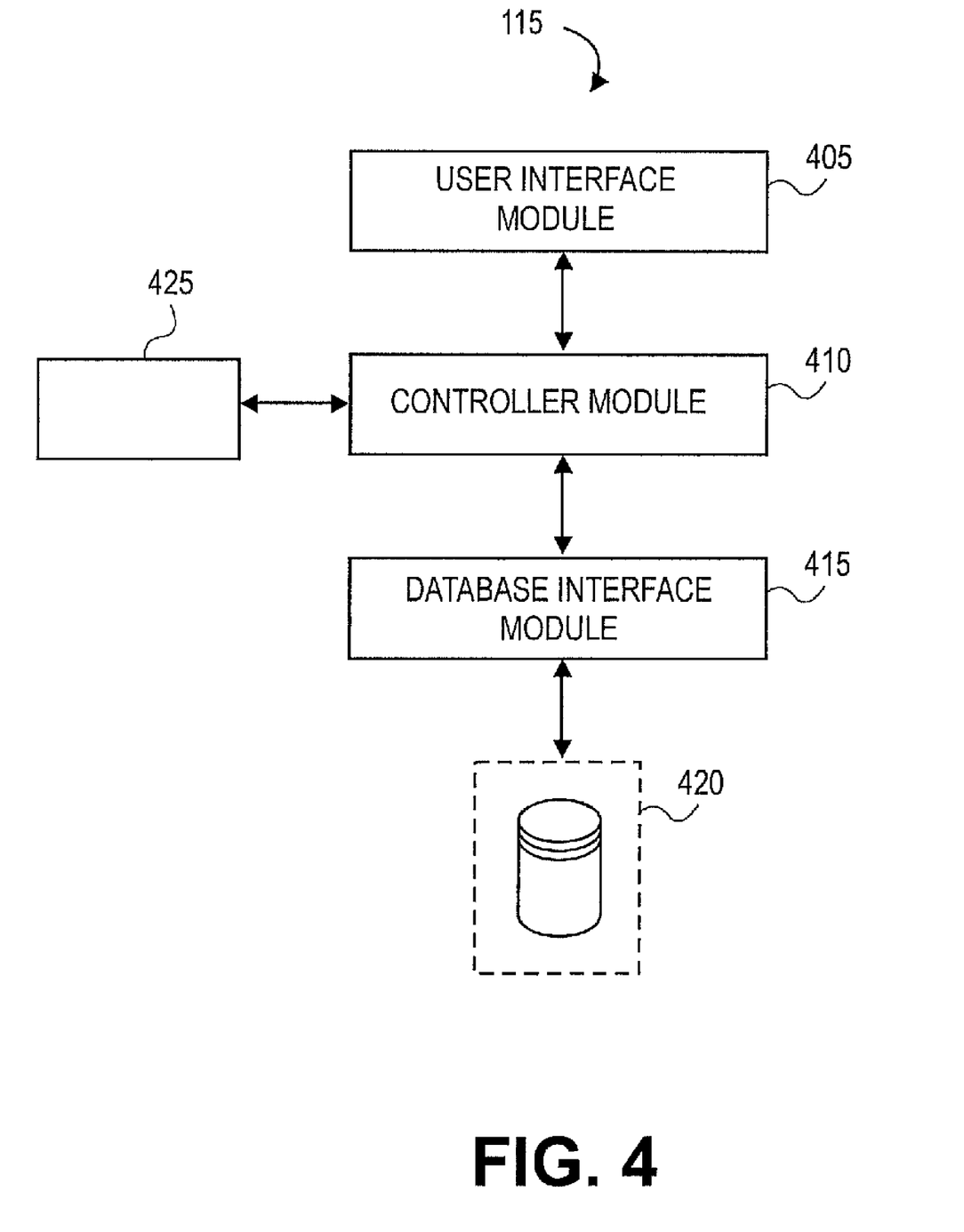
FIG. 4 illustrates an exemplary issue tracker server of the system shown in FIG. 1 in accordance with yet another embodiment.

FIG. 4 illustrates a more detailed block diagram of the issue tracker server 115 in accordance with another embodiment. It should be readily apparent to those of ordinary skill in the art that the issue tracker server 115 depicted in FIG. 4 represents a generalized schematic illustration and that other components may be added or existing components may be removed or modified.

As shown in FIG. 4, the issue tracker server 115 can comprise of a user interface module 405, a controller module 410, a database interface module 415, and a server interface 425. Similar to the service portal 105 and the knowledge server 110, the user interface module 405 of the issue tracker server 115 can be configured to generate GUIs for the service portal 105 to interface thereto. As with the knowledge server 110, the service portal 105 provides a unified interface to the issue tracker server 115. The service portal 105 can be configured to receive requests from users to access the issue tracker server 115. The received requests are processed by the issue tracker server 115 and any information is returned using the issue tracker server's GUIs as generated by the user interface module 405. The service portal 105 reformats any returning information from the issue tracker server 115 and the other servers in a unified GUI generated by the user interface module 205 of the service portal 105. In some instances, the service portal 105 can generate an overlay for data arriving from the other servers (110-120). Accordingly, a user can be presented with information in a consistent format.

The user interface module 405 can be implemented using HTML code, CSS sheets, Hyptext Pre-Processor ("PHP") code and/or Ruby on Rails (ROR) code. The controller module 410 can provide the associated code for the functionality provided by the GUIs generated by the user interface module 405.

The controller module 410 can be configured to communicate with the service portal 105, the knowledge server 110 and the chat server through a communication interface 425. The communication interface 425 can use SOAP or web service protocols over the Internet to provide the communication conduit.

The controller module 410 can also be configured to interface with the database 420. The database 420 can be configured to store the open and closed service tickets. The database 420 can also be configured to store links to or the actual articles and/or chats sessions used to resolve the issue. In some embodiments, the database 420 can be implemented using MySQL 5.x database or other open source database. Other embodiments, the database 420 can be implemented proprietary databases such as Oracle, Sybase, IBM, etc.

Although FIG. 4 depicts the user interface module 405, controller module 410, and the database interface module 415 as separate components, these modules (405-415) can be implemented using LAMP, which is an open source Web development platform based on Linux, Apache, MYSQL, and PHP.

Figure 5:
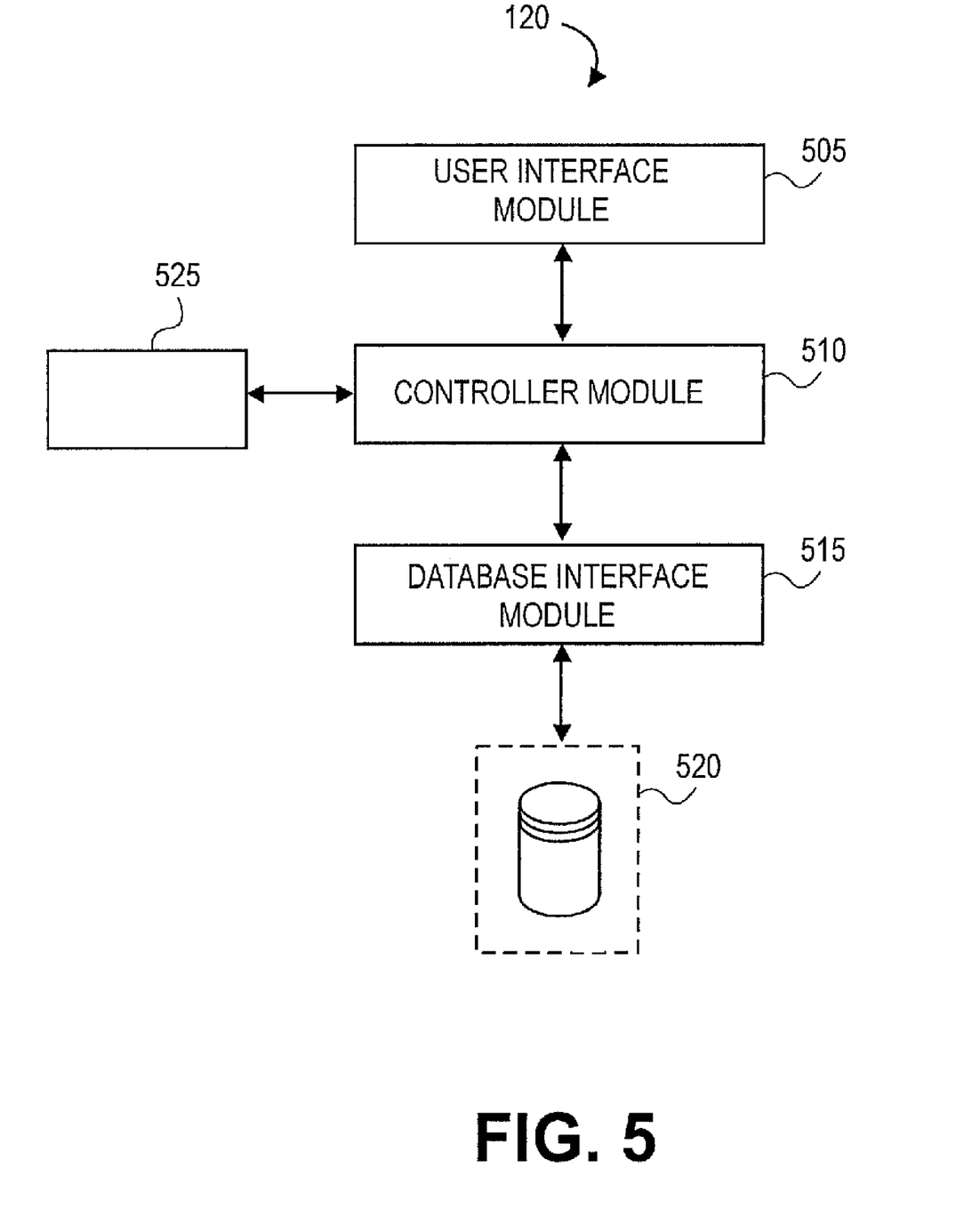
FIG. 5 depicts an exemplary chat server of the system shown in FIG. 1 in accordance with yet another embodiment.

FIG. 5 illustrates a more detailed block diagram of the chat server 120 in accordance with another embodiment. It should be readily apparent to those of ordinary skill in the art that the chat server 120 depicted in FIG. 5 represents a generalized schematic illustration and that other components may be added or existing components may be removed or modified.

The chat server 120 can be configured to provide chat services for users. The chat server 120 can provide a communication link between users and a group of support personnel. The chat server 120, can also provide a communication link between users of the service portal. The users can request access to support through a GUI of the service portal 105. Some embodiments can use Openfire to provide group and instant messaging service using the Extensible Messaging and Presence Protocol ("XMPP").

As shown in FIG. 5, the chat server 120 can comprise a user interface module 505, a controller module 510, a database interface module 515 and a database 520. The user interface module 505 of the chat server 120 can be configured to generate GUIs for the service portal 105 to interface thereto. The user interface module 505 can be implemented using HTML code, CSS, and/or Java Server pages.

As with the knowledge server 110 and the issue tracker server 115, the service portal 105 provides a unified interface to the chat server 120. The service portal 105 can be configured to receive requests from users to access the chat server 115. The received requests are processed by the chat server 120 to start a chat session with someone from a group of technical support personnel.

The received requests for chats can be processed by the controller module 510, which contains the associated code for the selected function in the GUI by a user. The controller module 510, in some embodiments, can be implemented using DWR.

The controller module 510 can also interface with a database interface module 515. The database interface module 515 can be configured to translate queries from the controller module 510 to appropriate format of the database 520 to store and retrieve information. The information stored in the database 520 can comprise of chat sessions between users and support personnel. In some embodiments, the database 520 can be implemented with a MySQL database. Returning to the database interface module 515, this module 515 can be implemented using plain old Java objects as known to those skilled in the art.

Although FIG. 5 depicts the user interface module 505, controller module 510, and the database interface module 515 as separate components, other embodiments can implement the functionality of these modules can be implemented using Tomcat Servlet container and web server from Apache Software Foundation.

Returning to FIG. 3, the knowledge server 110 can be configured with a tagging module 340 embedded in the controller module 310. The tagging module 340 can be configured to permit the user community of the service portal 105 to tag items in the knowledgebase. More particularly, the tagging module 340 can be configured to provide a predefined set of tags as well as a community set of tags. The predefined set of tags can be developed from the community set of tags by a group of users with super privileges (such as support personnel, verified experts, etc.). An example of the predefined set of tags can be a support-team tags. These tags would be used by the support personnel to tag items in the knowledgebase that are helpful, authoritative, or other high value. Accordingly, the predefined set of tags are given much more weight.

These users can apply the predefined set of tags to knowledgebase items, where the knowledgebase items can be articles, posts, or other similar information useful to the user community. Ordinary users can apply tags to knowledgebase items based on a community set of tags, where the community set of tags can be any term supplied by an ordinary user. The community set of tags can also be configured to show the popularity of any tag within the set. Accordingly, a subsequent user can search the knowledgebase based on the predefined set of tags, the community set of tags, or a combination of the two tag sets. The subsequent user can also narrow the search by determining the popularity of tag terms within the community set of tags.

Figure 6:
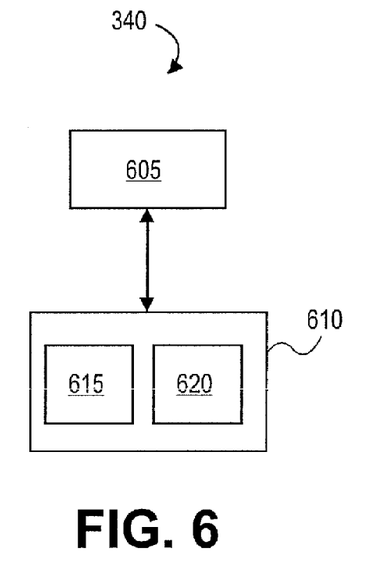
FIG. 6 illustrates an exemplary diagram of the tagging module in accordance with yet another embodiment.

FIG. 6 illustrates a block diagram of the tagging module 340 in accordance with yet another embodiment. It should be readily apparent to those of ordinary skill in the art that the tagging module 340 depicted in FIG. 6 represents a generalized schematic illustration and that other components may be added or existing components may be removed or modified.

As depicted in FIG. 6, the tagging module 340 comprises of a manager module 605 and a memory 610. The manager module 605 is configured to implement the functionality of the tagging module 340 as previously described and described in greater detail below with respect to FIGS. 7-8. The manager module 605 can be implemented in software code (Java, C, C++, etc.), hardware device (application specific integrated circuit, field programmable gate array, microprocessor, etc.) or combination thereof.

The manager module 605 can also be configured the memory 610. The memory 610 can store a set of community tag terms 615 as well as a predefined set of tag terms 620. The set of community tag terms 615 can be developed by the users of the community interfacing with the service portal 105. The users can freely add additional tags to the set of community tag terms 615.

The predefined set of tag terms 620 can be derived from the set of community tag terms 615 approved from the group of users with super privileges (such as support personnel, verified experts, etc.). Moreover, this group of users can only be permitted to add additional tag terms to the predefined set of tag terms 620.

A user can view the popularity of a term in the set of community tag terms 615. More particularly, a user, through a GUI of the service portal 105, can view the list of terms in the set of community tag terms 615. The service portal 105 formulates a request to the knowledge server 110, which then returns the requested information to the service portal 105. The requested information is presented in a list showing the popularity of each term in the set of community tag terms 615 by font size in some embodiments, i.e., the more popular the term, the larger the font.

Figure 7:
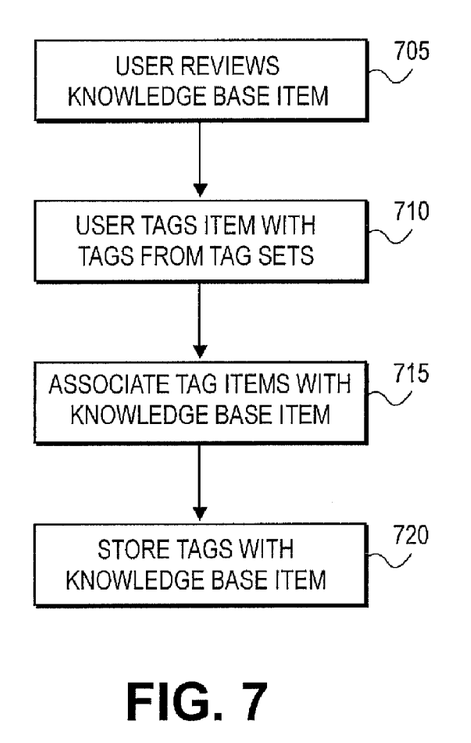
FIG. 7 depicts an exemplary flow diagram implemented by the tagging module in accordance with yet another embodiment.

FIG. 7 illustrates a flow diagram 700 implemented by the tagging module 340. It should be readily apparent to those of ordinary skill in the art that the flow diagram 700 depicted in FIG. 7 represents a generalized schematic illustration and that other steps may be added or existing steps may be removed or modified.

As shown in FIG. 7, a user can be reviewing a knowledgebase item, in step 705. More particularly, the user may have accessed the service portal 105 through their local computer via a web browser such as Opera, Mozilla, Internet Explorer, or other similar web browser applications. The service portal 105 presented a GUI for the user to search for items in the knowledgebase. The service portal 105 can be configured to process the request for the selected query to the controller module 215 of the service portal 105 and forward the request to the knowledge server 110 through the server interface 335. The knowledge server 110 can be configured to process the request through the broker module 315 of the knowledge server 315, which passes the request through the model module 320 and database interface module 325. The items matching the request are returned form the database 330 and possibly other third-party source can then be returned to the service portal 105.

In step 710, the user can tag a knowledge item with a tag term from either the set of community tag terms 615 and the predefined set of tags. More particularly, after reviewing a knowledge item, the user can select at least one term from either one of both the set of community tag terms 615 and the predefined set of tag terms 620 that the user would like to associate with the knowledge item. As previously mentioned, the knowledge item can be an article, a FAQ, a Wiki page or other written description. Multiple tag terms can be associated with the knowledge item.

In step 715, the tagging module 340 can be configured to associate the selected tag terms with the knowledge item. More particularly, the selected tag terms become part of the metadata associated with the knowledge item. Accordingly, subsequent users can search for the knowledge item based on the associated tags as well as search terms within the knowledge item.

In step 720, the tagging module 340 can be configured to store the knowledge item with the associated tags within the database 330 to be searched by subsequent users of the service portal 105.

Figure 8:
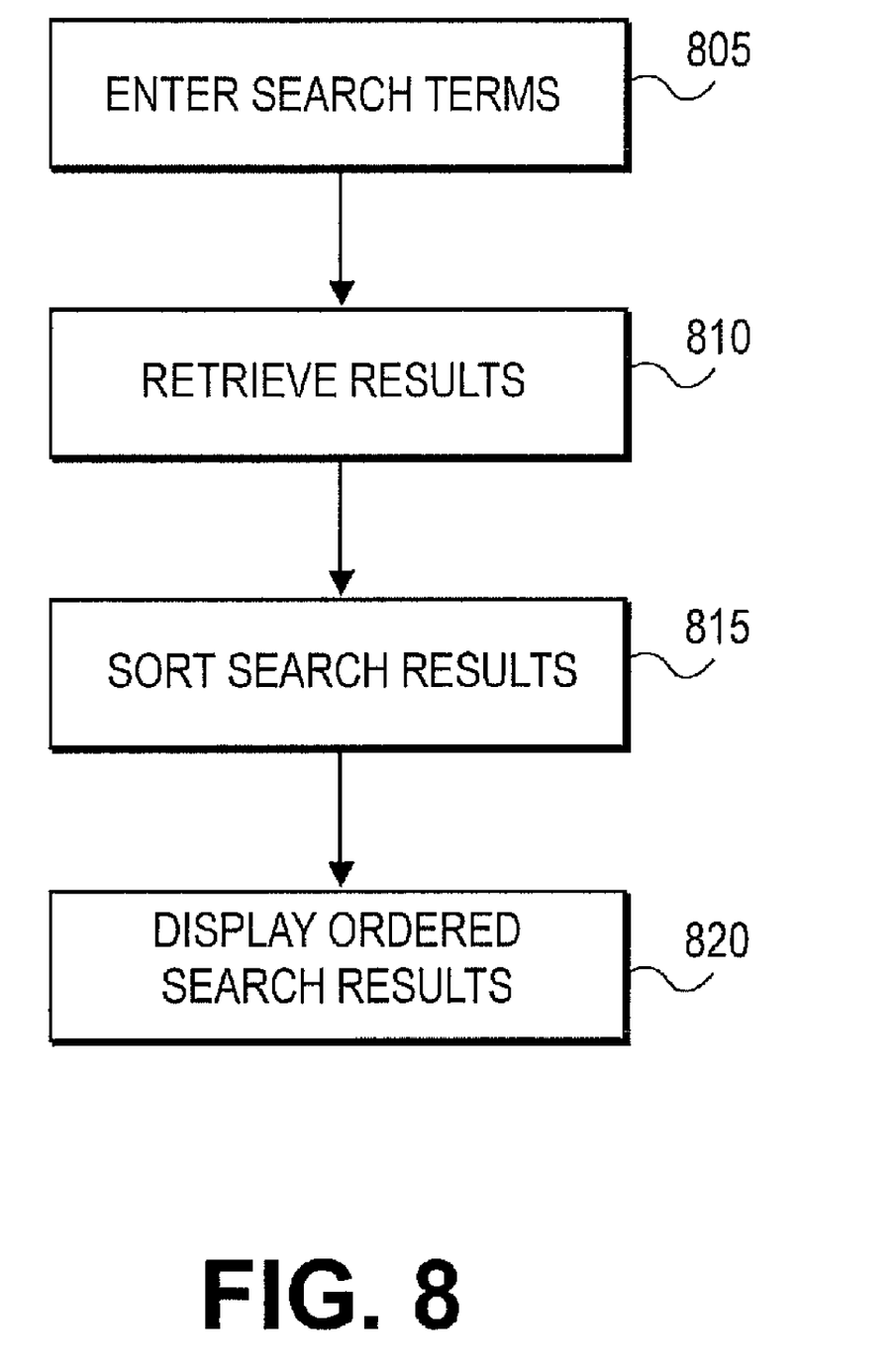
FIG. 8 illustrates another exemplary flow diagram implemented by the tagging module in accordance with yet another embodiment.

FIG. 8 illustrates a flow diagram 800 implemented by the tagging module 340 in accordance with yet another embodiment. It should be readily apparent to those of ordinary skill in the art that the flow diagram 800 depicted in FIG. 8 represents a generalized schematic illustration and that other steps may be added or existing steps may be removed or modified.

As shown in FIG. 8, in step 805, a user can enter search terms in a GUI generated by a service portal 105 to search for items in the knowledge server 110, i.e., search the knowledgebase. The user can enter terms from the set of community of tag terms 615 and/or the predefined set of tag terms 620 to search for information items from the knowledge server 110 onto the selected GUI.

The controller module 210 of the service portal 105 can be configured to format a request packet to the knowledge server 110, which is passed to the broker module 210 through the server interface 335 and the broker module 315 of the knowledge server 110.

The broker module 315 of the knowledge server 110 can be configured to formulate a query based on the model module 320 to pass the database 330 through the database interface module 325, in step 810. In some embodiments, the knowledge server 110 can be configured to work with third party web sites with the selected tag terms. The third party web site results can be grouped and ranked with the results from the knowledge server 110, in step 815.

In step 820, the broker module 315 of the knowledge server 110 can forward the search results in a ranked fashion. More particularly, the list of results can be ordered by the popularity of the tag terms associated with each result, a ranking or rating associated with each result or other criteria. Since items tagged with the tag terms from the predefined set of tag terms 620 are given more weight, these items are ranked higher and should float to the top of the results list. The results are passed onto to the service portal 105 where the results are displayed by another GUI generated by the controller module 210 of the service portal 105.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of organizing information, the method comprising:
    providing for a knowledgebase;
    providing for a first set of tags configured to be applied to items in the knowledgebase;
    providing for a second set of tags configured to be applied to items in the knowledgebase;
    searching the knowledgebase based on at least one of the first set of tags and the second set of tags; and
    ranking result items in a search result favoring the result items tagged with terms for the first set of tags.

2. The method of claim 1, further comprising providing privileges to the first set of users to designate the first set of tags.

3. The method of claim 1, further comprising providing tagging access to a sub-plurality of items tagged by at least one tag in the first set of tags in the knowledgebase by the second set of users for tagging.

4. The method of claim 1, further comprising providing access to the sub-plurality of items tagged with at least one tag from the second set of tags to the first set of users for additional tagging with the first set of tags.

5. The method of claim 1, further comprising providing access to a subset of items in the knowledgebase only to the first set of users for tagging.

6. The method of claim 1, further comprising:
    determining a status of an incoming item for the knowledgebase; and
    providing access only to the first set of users for tagging the incoming item in response to the status being associated with a certified status.

7. The method of claim 1, further comprising developing the first set of tags based on the second set of tags.

8. A system for providing and accessing information, the system comprising:
    a knowledgebase configured to store information items associated with a community;
    a portal configured to couple with the knowledgebase and provide access to the knowledgebase; and
    a tagging module configured to be coupled with the knowledgebase and the portal, wherein the tagging module is configured to provide for a first set of tags configured to be applied to the information items in the knowledgebase, provide for a second set of tags configured to be applied to information items in the knowledgebase, and search the knowledgebase based on at least one of the first set of tags and the second set of tags.

9. The system of claim 8, wherein the tagging module is further configured to assign privileges to the first set of users to use the first set of tags.

10. The system of claim 8, wherein the tagging module is further configured to prevent tagging access to a sub-plurality of items tagged by at least one tag in the first set of tags in the knowledgebase by the second set of users for tagging.

11. The system of claim 8, wherein the tagging module is further configured to provide access to the sub-plurality of items tagged with at least one tag from the second set of tags to the first set of users for additional tagging with the first set of tags.

12. The system of claim 8, wherein the tagging module is further configured to provide access to a subset of items in the knowledgebase only to the first set of users for tagging.

13. The system of claim 8, further comprising a staging area coupled to the knowledgebase, wherein staging area is configured to store a new information item received through the portal.

14. The system of claim 8, wherein the new information item is forwarded to the knowledgebase in response to the new information item being tagged with at least one tag from the second set of tags.

15. The system of claim 8 wherein the new information is forwarded to the knowledgebase in response to the new information item being tagged with at least one tag from the first set of tags.

16. The system of claim 8, wherein the first set of tags is developed from the second set of tags.

* * * * *